No. 724,099. PATENTED MAR. 31, 1903.
J. HENGEN.
TROLLEY WHEEL.
APPLICATION FILED JUNE 30, 1902.
NO MODEL. 2 SHEETS—SHEET 1.

Witnesses
A. L. Lord.
E. A. Tibbitts.

Inventor:
Jacob Hengen.
Geo. W. Tibbitts, Attorney.

No. 724,099. PATENTED MAR. 31, 1903.
J. HENGEN.
TROLLEY WHEEL.
APPLICATION FILED JUNE 30, 1902.
NO MODEL. 2 SHEETS—SHEET 2.
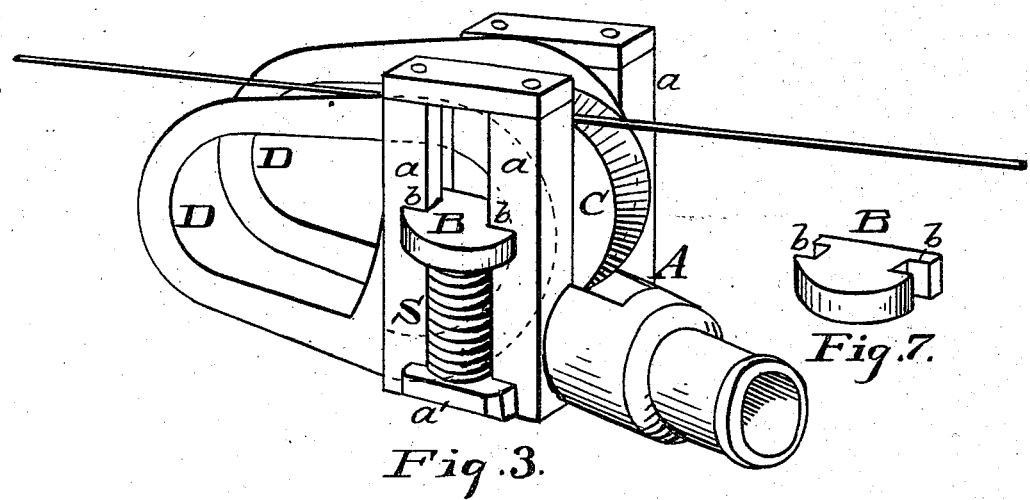
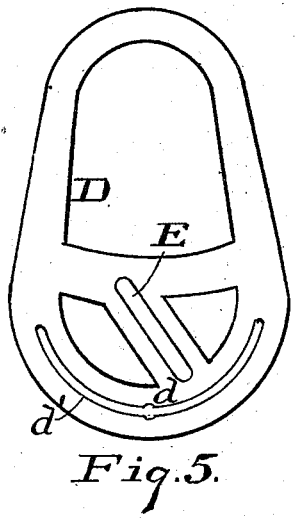
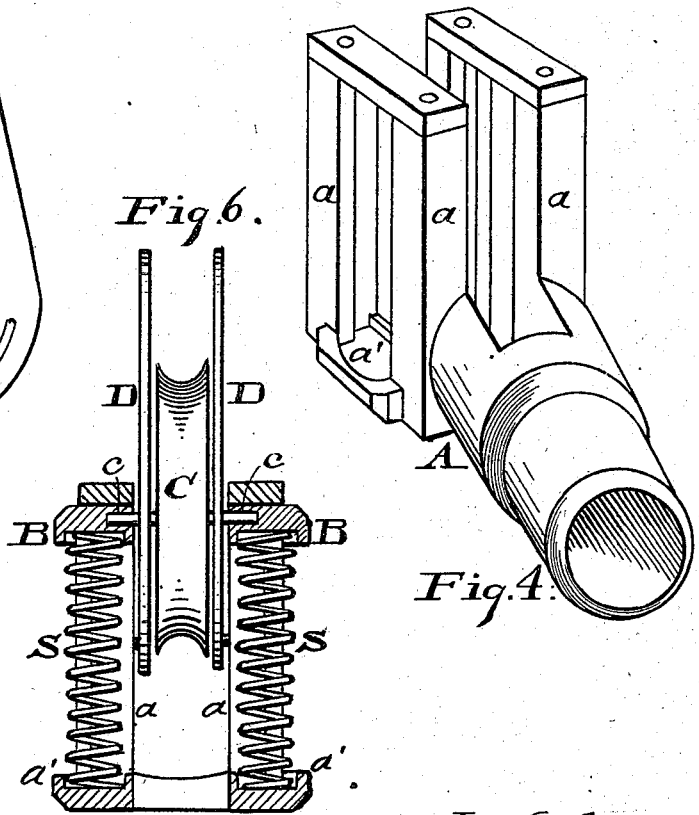
Witnesses.
A. L. Lord
E. A. Tibbitts
Inventor:
Jacob Hengen,
pr Geo. W. Tibbitts
Attorney

UNITED STATES PATENT OFFICE.

JACOB HENGEN, OF NORTH AMHERST, OHIO, ASSIGNOR OF ONE-HALF TO ADOLPH BAKER, OF NORTH AMHERST, OHIO.

TROLLEY-WHEEL.

SPECIFICATION forming part of Letters Patent No. 724,099, dated March 31, 1903.

Application filed June 30, 1902. Serial No. 113,860. (No model.)

*To all whom it may concern:*

Be it known that I, JACOB HENGEN, a citizen of the United States of America, and a resident of North Amherst, Lorain county, State of Ohio, have invented certain new and useful Improvements in Trolley-Wheels, of which the following is a specification.

This invention relates to trolley-wheels for electric cars, having for its object to provide for retaining the wheel on the current-wire while a car is running at great speed and the car is jarring and jumping on the track; and the invention consists of a fork having spring journal-bearings for the wheel and having pivoted wings at each side of the wheel actuated by the rise and fall of the wheel in its bearings, whereby when the wheel jars upon the trolley-wire the wheel will retain its contact with the wire, and at the same time the wings will rise in conjunction with the wheel and prevent the wheel from jumping off or away from the wire.

The invention also consists in other features of improvement, substantially as hereinafter described, and pointed out in the claim.

Figure 2:
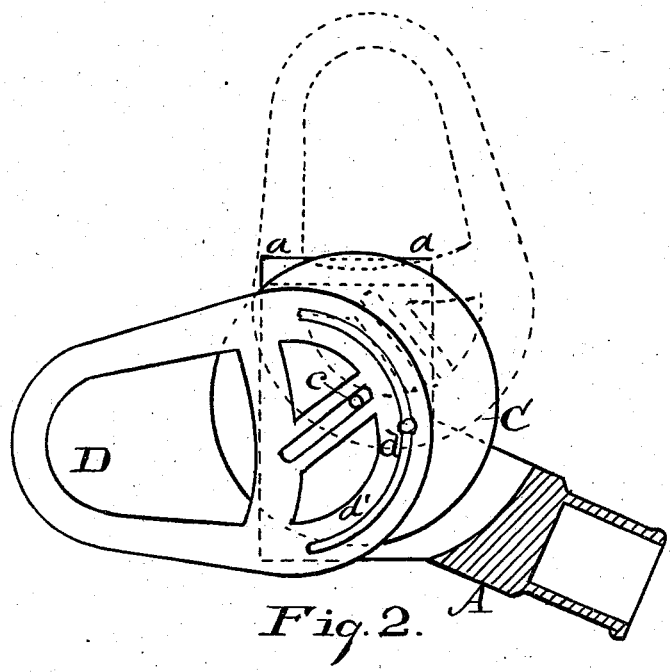
Figure 1:
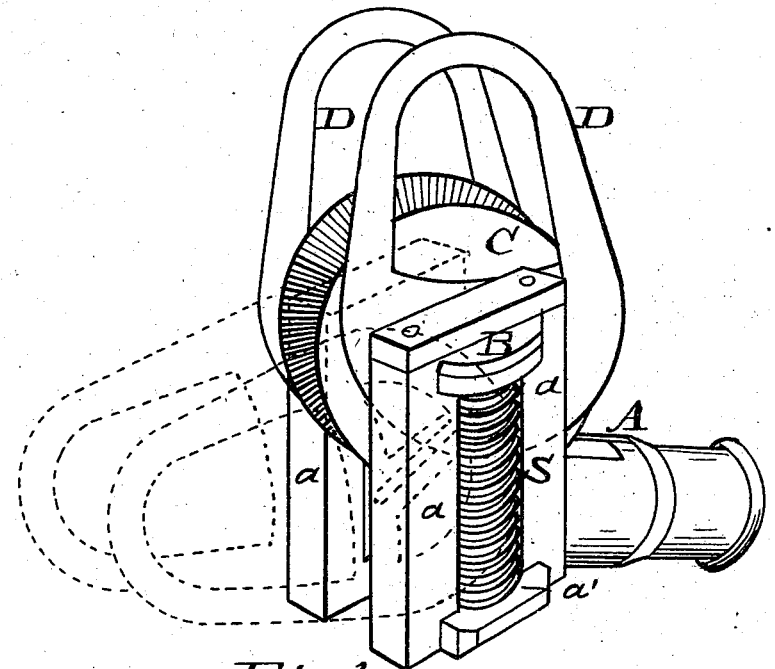

In the accompanying drawings, Sheet 1, Figure 1 is a perspective view of my improved trolley-wheel, showing the wheel and wings in the upper position, as they would be when off the wire. Fig. 2 is a longitudinal section through the fork, showing position of the wings as they would appear when the wheel is held down by contact with the wire. Sheet 2, Fig. 3, is a perspective view of the trolley-wheel when in contact with the wire and in running order. Fig. 4 is a detached perspective view of the trolley-fork. Fig. 5 is a detached view of one of the wings. Fig. 6 is a vertical section through the fork, showing the spring-bearings for the wheel. Fig. 7 is a detached perspective view of one of the journal-bearing blocks for the trolley-wheel.

A in the several figures represents the fork, having upright arms $a\ a$ at each side of the opening for the support of the bearings of the wheel. At the bottom of the arms, at each side of the fork, is formed a seat $a'$ for the springs $s\ s$. B B are sliding blocks for carrying the axle-journals $c\ c$ of the wheel C. Said sliding blocks have end grooves $b\ b$, which ride on the inside lines of the arms $a\ a$. The blocks B B have seats which fit and rest on the top ends of the springs $s\ s$.

D D are wings made in the form of egg-shaped frames. The said wings are pivoted at $d$ to the inside faces of the arms $a\ a$ at the point marked $d$ on Fig. 2. In said wings are made diagonal slots E E, through which the journals $c\ c$ of the wheel C pass and by means of which the wings are moved on their pivots as the said wheel C moves up or down, the journals $c\ c$ riding in said slots E E for performing this movement.

It will be seen from the foregoing that the wings will act by the upward and downward movements of the wheel, as above described, to serve as fenders for keeping the wheel from jarring off from the current-wire and also to serve as ready finders should the wheel jump entirely off. The rise and fall of the wheel on the springs also serves well to prevent voltaic arcing between the wheel and the current-wire.

The curved slot $d'$, connected with the pivot $d$, is designed for an emergency. It will be observed that the slot is considerably narrower than the pivot. This is to provide that in case the car should run backward and the wings should catch on some obstruction instead of their being bent or broken they would be turned over forward on the wheel-journals $c\ c$ by the yielding of the narrow slot $d'$ on the pivot $d$.

H is the ferrule on the fork for attaching it to the trolley-pole.

Having described my invention, what I claim is—

The improved trolley-wheel consisting of the fork A, arms $a\ a$ on said fork, seats $a'\ a'$ in said arms, springs $s\ s$ in the arms, journal-blocks B B supported on said springs, a wheel C having its journals carried by said blocks B B; wings D D pivoted to the arms at each side of the wheel, a slot E in each of said wings through which the wheel-journals pass, and by which the wings are raised and lowered by the rise and fall of the wheel, constructed and combined to operate substantially as described.

Signed by me at North Amherst, Ohio, this 26th day of June, 1902.

JACOB HENGEN.

Witnesses:
 A. BAKER,
 CHARLES EBBS.